US00H002182H

(19) United States
(12) Statutory Invention Registration
Freel et al.

(10) Reg. No.: US H2182 H
(43) Published: Feb. 6, 2007

(54) LOW EMISSION, NON-OXYGENATED FUEL COMPOSITION

(75) Inventors: John Freel, Novato, CA (US); Joseph S. Welstand, Pinole, CA (US); William R. Scott, El Cerrito, CA (US); Michael J. Fuchs, Rancho Palos Verdes, CA (US); Scott R. Brundage, Richmond, CA (US)

(73) Assignee: Chevron U.S.A. Inc., PA (US)

(21) Appl. No.: 09/490,147

(22) Filed: Jan. 24, 2000

Related U.S. Application Data

(63) Continuation of application No. 09/071,793, filed on May 4, 1998, now abandoned.

(51) Int. Cl.
*C10L 1/16* (2006.01)

(52) U.S. Cl. ..... 585/14; 208/16; 208/17

(58) Field of Classification Search ..... 208/16, 208/17; 585/14
See application file for complete search history.

(56) References Cited

U.S. PATENT DOCUMENTS

| | | | | | |
|---|---|---|---|---|---|
| 4,824,552 | A | * | 4/1989 | Nagasawa et al. | 208/17 |
| 5,288,393 | A | * | 2/1994 | Jessup et al. | 208/16 |
| H1305 | H | * | 5/1994 | Townsend et al. | 44/449 |
| 5,346,609 | A | * | 9/1994 | Fletcher et al. | 208/89 |
| 5,401,280 | A | * | 3/1995 | Kaneko et al. | 44/449 |
| 5,593,567 | A | * | 1/1997 | Jessup et al. | 44/449 |
| H1716 | H | * | 4/1998 | Rapp et al. | 208/17 |
| 6,132,479 | A | * | 10/2000 | Welstand et al. | 44/300 |
| 6,383,236 | B1 | * | 5/2002 | Welstand et al. | 44/300 |

FOREIGN PATENT DOCUMENTS

EP 0596611 A1 * 5/1994

GB 2360042 A * 9/2001

OTHER PUBLICATIONS

"An Overview of Unocal's Low Emission Gasoline Research Program", Jessup et al., International Congress & Exposition, Detroit, Michigan, Feb. 24–28, 1992.

* cited by examiner

*Primary Examiner*—M. Clement
(74) *Attorney, Agent, or Firm*—Buchanan Ingersoll PC

(57) ABSTRACT

Provided is an unleaded gasoline fuel which is substantially free of oxygenates, and most preferably contains substantially zero oxygenates. The gasoline fuel also has a Reid vapor pressure less then 7.5 psi, a sulfur content less than 30 ppmw, an aromatic hydrocarbon content between 25 and 30 volume percent, and/or a 50% D-86 Distillation Temperature between 210 and 220° F., and/or a 90% D-86 Distillation Temperature between 300 and 330° F., and the fuel composition fails the California Predictive Model requirements for emissions. Preferably, the olefin content of the fuel is also 8 volume percent or less. Such a gasoline fuel offers a substantially oxygenate free gasoline which avoids the environmental impact of oxygenates, yet when combusted in an internal combustion automobile provides good performance and good emissions, despite failing the California Predictive Model. The gasoline fuel in particular can provide surprisingly lower $NO_x$ emissions than that predicted by the California Predictive Model.

53 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LOW EMISSION, NON-OXYGENATED FUEL COMPOSITION

The present application is a continuation application of U.S. Ser. No. 09/071,793, filed May 4, 1998, now abandoned.

BACKGROUND OF THE INVENTION

1. Field of the Invention

The present invention relates to fuels, particularly gasoline fuels which are substantially free of oxygenates. More specifically, the present invention relates to a low-emission gasoline fuel which, upon combustion, provides surprisingly low emissions, particularly of nitrogen oxide emissions, and is also substantially free of oxygen-containing compounds.

2. Brief Description of the Prior Art

One of the major environmental problems confronting the United States and other countries is atmospheric pollution caused by the emission of pollutants in the exhaust gases and gasoline vapor emissions from gasoline fueled automobiles. This problem is especially acute in major metropolitan areas where atmospheric conditions and the great number of automobiles result in aggravated conditions. While vehicle emissions have been reduced substantially, air quality still needs improvement. The result has been that regulations have been passed to further reduce such emissions by controlling the composition of gasoline fuels. These specially formulated, low emission gasolines are often referred to as reformulated gasolines. In California, low emissions gasoline is often referred to as California Phase 2 gasoline. One of the requirements of these gasoline regulations is that, in certain geographic areas, oxygen-containing hydrocarbons, or oxygenates, be blended into the fuel.

Congress and regulatory authorities, such as CARB (the California Air Resources Board), have focused on setting specifications for low emissions, reformulated gasoline. The specifications, however, require the presence of oxygenates in gasoline sold in areas that are not in compliance with federal ambient air quality standards for ozone, and the degree of non-attainment is classified as severe, or extreme. Among the emissions which the reformulated gasoline is designed to reduce, are nitrogen oxides ($NO_x$), hydrocarbons (HC), and toxics (benzene, 1,3-butadiene, formaldehyde and acetaldehyde). A reduction in these emissions has been targeted due to their obvious impact upon the air we breathe and the environment in general.

There is increasing attention from environmental agencies to the need for a reduction in emissions of nitrogen oxides. $NO_x$ emissions are known precursors for smog created in metropolitan areas. Most of the $NO_x$ emissions are man-made, with gasoline fueled engines generating about 24% of the man-made $NO_x$ emissions. NO is the major constituent of $NO_x$ emissions from combustion processes. NO is a precursor of $NO_2$ in the atmosphere and a critical constituent in the formation of ozone. $NO_2$ can irritate the lungs and reduce respiratory function. $NO_x$ can be an important precursor to secondary formation of particulates, according to the "National Air Quality and Emission Trends Report," 1992, Office of Air Quality Planning and Standards, U.S. Environmental Protection Agency, EPA 454/R-93-031, October 1993. A reduction of nitrogen oxides, particularly in large metropolitan areas such as Los Angeles and Sacramento, Calif., and many eastern U.S. states, would be most valuable. As a consequence of all these harmful effects, the reformulated gasolines have been designed to reduce $NO_x$ emissions.

Oxygenated gasoline is a mixture of conventional hydrocarbon-based gasoline and one or more oxygenates. Oxygenates are combustible liquids which are made up of carbon, hydrogen and oxygen. All the current oxygenates used in reformulated gasolines belong to one of two classes of organic molecules: alcohols and ethers. The Environmental Protection Agency regulates which oxygenates can be added to gasoline and in what amounts.

The primary oxygen-containing compound employed in gasoline fuels today is methyl tertiary butyl ether (MTBE). While oxygen is in most cases required in reformulated gasolines to help effect low emissions, the presence of oxygenates in gasoline fuels has begun to raise legitimate environmental concerns. For example, the oxygenate methyl tertiary butyl ether has been observed in drinking water reservoirs, and in a few instances, ground water in certain areas of California. As a result, the public is beginning to question the benefits and/or importance of having cleaner burning gasolines, if they simply pollute the environment in other ways. Furthermore, oxygenates also have a lower thermal energy content than non-oxygenated hydrocarbons, and therefore reduce the fuel economy of gasoline fueled motor vehicles.

Thus, while some of the concerns with regard to gasoline fuels containing oxygenates, such as methyl tertiary butyl ether, could be overcome by further safe handling procedures and the operation of present facilities to reduce the risk of any spills and leaks, there remains a growing public concern with regard to the use of oxygenates in gasoline fuels. In an effort to balance the need for lower emission gasolines and concerns about the use of oxygenates it, therefore, would be of great benefit to the industry if a cleaner burning gasoline without oxygenates could be made. A cleaner burning gasoline resulting in low $NO_x$ emissions would be of particular benefit to the environment in light of the increased attention to reducing nitrogen oxide emissions. The availability of such a gasoline, which contained substantially no oxygenates, would allow the public to realize the environmental benefits of low emissions, yet ease the concern of potential contamination of ground waters, and the environment in general, with oxygenates. Of benefit to the industry would also be such a low emission gasoline which contained substantially no oxygenates and also offered more flexibility to refiners in blending the gasoline.

Accordingly, it is an object of the present invention to provide a gasoline fuel which can truly benefit the environment and offer good performance.

It is another object of the present invention to provide a gasoline fuel which provides good emissions, yet is substantially free of oxygenates.

Yet another object of the present invention is to provide a low-emission, substantially oxygenate-free gasoline fuel which exhibits surprisingly low $NO_x$ emissions when combusted in an automobile internal combustion engine.

Still another object of the present invention is to provide a gasoline fuel which provides good emissions and also permits more flexibility to refiners in blending the gasoline.

These and other objects of the present invention will become apparent upon a review of the following specification and the claims appended thereto.

SUMMARY OF THE INVENTION

In accordance with the foregoing objectives, the present invention provides an unleaded gasoline fuel which is substantially free of oxygenates, i.e., the fuel contains less than 1.0 weight percent oxygen based on the total weight of the fuel composition, and most preferably contains no oxygen containing compounds. The gasoline fuel of the present invention also has a Reid vapor pressure less than 7.5 psi, a sulfur content less than 30 ppmw, more preferably less than 20 ppmw, an olefin content of no greater than 8 volume percent and an aromatic hydrocarbon content between 25 and 30 volume percent, and/or a 50% D-86 Distillation Temperature between 210 and 220° F., and/or a 90% D-86 Distillation Temperature between 300 and 330° C. The fuel composition also does not meet the emissions performance criteria of the California Predictive Model for emissions. Such a gasoline fuel offers a substantially oxygenate free gasoline which avoids the environmental impact of oxygenates, yet when combusted in an internal combustion automobile provides good performance and good emissions, despite failing the present California Predictive Model requirements.

In particular, surprisingly low $NO_x$ emissions can be observed for the gasoline fuels of the present invention, with the $NO_x$ emissions being substantially lower than that predicted by the California Predictive Model established by the California Air Resources Board (CARB). Good Performance with surprisingly low $NO_x$ emissions can be obtained despite the fact that the gasoline fuel of the present invention does not meet the specifications for the CARB reformulated gasoline fuel, and fails the California Predictive Model. The gasoline composition of the present invention is substantially free of oxygenates, does not meet the flat limits for at least one, if not more, of the aromatics, T90 and/or T50 requirements set for the new (Phase 2) reformulated gasoline, and fails The California Predictive Model for emissions. Nevertheless, the gasoline fuel of the present invention allows one to enjoy good emissions, and particularly surprisingly low $NO_x$ emissions, while also avoiding the potential problems of oxygenates. For it has been surprisingly found that when one controls the amount of sulfur in accordance with the present invention to less than 30 ppmw (and more preferably less then 20 ppmw), and in particular when one controls the amount of sulfur together with olefins in accordance with the present invention to less than 8 volume percent, it is possible to have additional flexibility with respect to the other regulated fuel properties, i.e., aromatics, T90 and T50, in a non-oxygenated fuel without sacrificing low emissions.

In another embodiment of the present invention, there is provided a method for operating an automotive vehicle having a spark-ignited internal combustion engine. The method comprises introducing into the engine an unleaded gasoline which is substantially free of oxygenates in accordance with the present invention. The unleaded gasoline is then combusted in the engine. In a preferred embodiment, the automotive vehicle also has a catalytic converter through which at least some of the engine exhaust emissions created by combusting the unleaded gasoline are introduced, with the resulting emissions then being discharged from the catalytic converter and subsequently to the atmosphere. Good performance and surprisingly low $NO_x$ emissions are realized upon using the unleaded gasoline of the present invention in the operation of an automobile.

DETAILED DESCRIPTION OF THE INVENTION

The present invention is directed to gasoline compositions having properties which minimize the amount of exhaust pollutants, particularly nitrogen oxides, emitted during combustion, while also overcoming the potential detrimental impact, environmental and otherwise, of oxygenates. In particular, the gasoline formulations of the present invention provide emissions of nitrogen oxide which are surprisingly low in that they are much lower than predicted by the California Predictive Model developed by CARB. While the compositions of the present invention offer such surprising low emissions, as well as good performance as a gasoline, they also offer the advantage of avoiding the problems inherent with oxygenates, as the gasoline formulations of the present invention are substantially free of oxygenates.

Gasolines are well known fuels, generally composed of a mixture of numerous hydrocarbons having different boiling points at atmospheric pressure. Thus, a gasoline fuel boils or distils over a range of temperatures, unlike a pure compound. In general, a gasoline fuel will distil over the range of from about, room temperature to 437° F. (225° C.). This temperature range is approximate, of course, and the exact range will depend on the conditions that exist in the location where the automobile is driven. The distillation profile of the gasoline can also be altered by changing the mixture in order to focus on certain aspects of gasoline performance, depending on the time of year and geographic location in which the gasoline will be used.

Gasolines are therefore, typically composed of a hydrocarbon mixture containing aromatics, olefins, and paraffins, with reformulated gasoline most often containing an oxygen compound, i.e., an oxygenate such as methyl tertiary butyl ether. Gasolines may also contain various additives, such as deposit control additives, demulsifiers, corrosion inhibitors, and antioxidants. The fuels contemplated in the present invention are unleaded gasolines (herein defined as containing a concentration of lead no greater than 0.05 gram of lead per gallon which is 0.013 gram of lead per liter). The preferred fuels will also have a Research Octane Number (RON) of at least 90. The anti-knock value (R+M)/2 for regular gasoline is generally at least 87, and for premium at least 92.

In an attempt to reduce harmful emissions upon the combustion of gasoline fuels, regulatory boards as well as Congress have developed certain specifications for reformulated gasolines. One such regulatory board is that of the State of California, i.e., the California Air Resources Board (CARB). In 1991, specifications were developed by CARB for California gasolines which, based upon testing, should provide good performance and low emissions. The specifications and properties of the reformulated gasoline, which is referred to as the Phase 2 reformulated gasoline or California Phase 2 gasoline, are shown in Table 1 below.

TABLE 1

Properties and Specifications for Phase 2 Reformulated Gasoline

| Fuel Property | Units | Flat Limit | Averaging Limit | Cap Limit |
|---|---|---|---|---|
| Reid vapor pressure (RVP) | psi, max. | 7.00[1] | | 7.00 |
| Sulfur (SUL) | ppmw | 40 | 30 | 80 |
| Benzene (BENZ) | vol. %, max. | 1.00 | 0.80 | 1.20 |
| Aromatic HC (AROM) | vol. %, max. | 25.0 | 22.0 | 30.0 |
| Olefin (OLEF) | vol. %, max. | 6.0 | 4.0 | 10.0 |
| Oxygen (OXY) | wt. % | 1.8 (min)<br>2.2 (max) | | 1.8 (min)<br>2.7 (max)[2] |
| Temperature at 50% distilled (T50) | deg. F. | 210 | 200 | 220 |
| Temperature at 90% distilled (T90) | deg. F. | 300 | 290 | 330 |

[1]Applicable during the summer months identified in 13 CCR, sections 2262.1(a) and (b).
[2]Applicable during the winter months identified in 13 CCR, sections 2262.5(a).

In Table 1, as well as for the rest of the specification, the following definitions apply:

Aromatic hydrocarbon content (Aromatic HC, AROM) means the amount of aromatic hydrocarbons in the fuel expressed to the nearest tenth of a percent by volume in accordance with 13 CCR (California Code of Regulations), section 2263.

Benzene content (BENZ) means the amount of benzene contained in the fuel expressed to the nearest hundredth of a percent by volume in accordance with 13 CCR, section 2263.

Olefin content (OLEF) means the amount of olefins in the fuel expressed to the nearest tenth of a percent by volume in accordance with 13 CCR, section 2263.

Oxygen content (OXY) means the amount of actual oxygen contained in the fuel expressed to the nearest tenth of a percent by weight in accordance with 13 CCR, section 2263.

Potency-weighted toxics (PWT) means the mass exhaust emissions of benzene, 1,3-butadiene, formaldehyde, and acetaldehyde, each multiplied by their relative potencies with respect to 1,3-butadiene, which has a value of 1.

Predictive model means a set of equations that relate emissions performance based on the properties of a particular gasoline formulation to the emissions performance of an appropriate baseline fuel.

Reid vapor pressure (RVP) means the vapor pressure of the fuel expressed to the nearest hundredth of a pound per square inch in accordance with 13 CCR, section 2263.

Sulfur content (SUL) means the amount by weight of sulfur contained in the fuel expressed to the nearest part per million in accordance with 13 CCR, section 2263.

50% distillation temperature (T50) means the temperature at which 50% of the fuel evaporates expressed to the nearest degree Fahrenheit in accordance with 13 CCR, section 2263.

90% distillation temperature (T90) means the temperature at which 90% of the fuel evaporates expressed to the nearest degree Fahrenheit in accordance with 13 CCR, section 2263.

Toxic air contaminants means exhaust emissions of benzene, 1,3-butadiene, formaldehyde, and acetaldehyde.

The pollutants addressed by the foregoing specifications include oxides of nitrogen ($NO_x$), and hydrocarbons (HC), which are generally measured in units of gm/mile, and potency-weighted toxics (PWT), which are generally measured in units of mg/mile.

The Phase 2 reformulated gasoline regulations define a comprehensive set of specifications for gasoline (Table 1). These specifications have been designed to achieve large reductions in emissions of criteria and toxic air contaminants from gasoline-fueled vehicles. Gasolines which do not meet the specifications are believed to be inferior with regard to the emissions which result from their use in vehicles. All gasolines sold in California, beginning Jun. 1, 1996, have had to meet CARB's Phase 2 requirements as descried below. The specifications address the following eight gasoline properties:

Reid vapor pressure (RVP)

Sulfur

Oxygen

Aromatic hydrocarbons

Benzene

Olefins

Temperature at which 90 percent of the fuel has evaporated (T90)

Temperature at which 50 percent of the fuel has evaporated (T50)

The Phase 2 gasoline regulations include gasoline specifications that must be met at the time the gasoline is supplied from the production facility. Producers have the option of meeting either "flat" limits or, if available, "averaging" limits, or, alternatively a Predictive Model equivalent performance standard.

The flat limits must not be exceeded in any gallon of gasoline leaving the production facility. For example, the aromatic content of gasoline, subject to the flat limit, could not exceed 25 volume percent (see Table 1).

The averaging limits for each fuel property established in the regulations are numerically more stringent than the comparable flat limits for that property. Under the averaging option, the producer may assign differing "designated alternative limits" (DALs) to different batches of gasoline being supplied from the production facility. Each batch of gasoline must meed the DAL assigned for the batch. In addition, a producer supplying a batch of gasoline with a DAL less stringent than the averaging limit must, within 90 days before or after, supply from the same facility sufficient quantities of gasoline subject to more stringent DALs to fully offset the exceedances of the averaging limit.

The Phase 2 gasoline regulations also contain "cap" limits. The cap limits are absolute limits that cannot be exceeded in any gallon of gasoline sold or supplied throughout the gasoline distribution system. These cap limits are of particular importance when the California Predictive Model or averaging is used.

A mathematical model, the California Predictive Model, has also been developed by CARB to allow refiners more flexibility. Use of the predictive model is designed to allow producers to comply with the Phase 2 gasoline requirements by producing gasoline to specifications slightly different from either the averaging or flat limit specifications set forth in the regulations. However, producers must demonstrate that the alternative Phase 2 gasoline specifications will result in equivalent or lower emissions compared to Phase 2 gasoline meeting either the flat or averaging limits as indicated by the Predictive Model. Further, the cap limits must be met for all gasoline formulations, even alternative formulations allowed under the California Predictive Model. When the Predictive Model is used, the eight parameters of Table 1 are limited to the cap limits.

In general, the California Predictive Model is a set of mathematical equations that allows one to compare the expected exhaust emissions performance of a gasoline with a particular set of fuel properties to the expected exhaust emissions performance of an appropriate gasoline fuel. One or more selected fuel properties can be changed when making this comparison.

Generally, in a predictive model, separate mathematical equations apply to different indicators. For example, a mathematical equation could be developed for an air pollutant such as hydrocarbons; or, a mathematical equation could be developed for a different air pollutant such as the oxides of nitrogen.

Generally, a predictive model for vehicle emissions is typically characterized by:

the number of mathematical equations developed, the number and type of motor vehicle emissions tests used in the development of the mathematical equations, and the mathematical or statistical approach used to analyze the results of the emissions tests.

The California Predictive Model is comprised of twelve mathematical equations. One set of six equations predicts emissions from vehicles in Technology Class 3 (model years 1981–1985), another set of six is for Technology Class 4 (model years 1986–1993). For each technology class, one equation estimates the relative amount of exhaust emissions of hydrocarbons, the second estimates the relative amount of exhaust emissions of oxides of nitrogen, and four are used to estimate the relative amounts of exhaust emissions of the four toxic air contaminants: benzene, 1,3-butadiene, acetaldehyde, and formaldehyde. These toxic air contaminants are combined based on their relative potential to cause cancer, which is referred to as potency-weighting.

In creating the California Predictive Model, CARB compiled and analyzed the results of over 7,300 vehicle exhaust emissions tests. A standard statistical approach to develop the mathematical equations to estimate changes in exhaust emissions was used based upon the data collected.

In summary, specific requirements were created by the California Air Resources Board to restrict the formulation of gasoline to ensure the production of gasoline which produces low emissions when used in automobiles.

The gasoline formulations of the present invention, however, contain substantially no oxygenates. By substantially no oxygenates, it is meant that the gasoline formulation contains less than at least one weight percent oxygen, or preferably less than 0.5 weight percent oxygen, and most preferably substantially zero weight percent oxygen. Thus, for the purposes of the present invention, if some oxygen containing compounds are contained in the gasoline formulation, the amount must be far less than that specified for California Phase 2 gasoline when oxygenates are required. Basically, the gasoline formulations of the present invention contain substantially no oxygenates.

Despite the removal of oxygenates, the gasoline formulations of the present invention also offer the advantage of good emissions. This is the case even though the gasoline formulations also fail to meet the equivalent performance standard of the California Predictive Model. It has been surprisingly found that despite not meeting the Predictive Model requirements for reformulated gasolines, the gasolines of the present invention offer good performance, and surprisingly low $NO_x$ emissions. In fact, the gasolines of the present invention offer $NO_x$ emissions performance which is substantially better than that predicted by the California Predictive Model.

The unleaded gasoline fuel of the present invention first requires that it be substantially free of oxygenates. The fuel also exhibits a Reid vapor pressure of less than 7.5 psi, more preferably 7.0 or less, and a sulfur content of less than 30 ppmw, more preferably less than 20 ppmw, even more preferably less than 15 ppmw, and most preferably about 10 ppmw or less. It is also preferred that the gasoline fuel have an olefin content no greater than 8 volume percent, preferably 6 volume percent or less, more preferably 5 volume percent or less, and most preferably about 2–3 volume percent or less. The unleaded gasoline fuel also has an aromatic hydrocarbon content between 25 and 30 volume percent, and/or a 50% D-86 Distillation Temperature between 210 and 220° F., and/or a 90% distillation temperature of between 300 and 330° F.

Among other factors, therefore, the present invention is based upon the discovery that one can substantially remove all oxygen containing compounds from a fuel formulation, be within the cap limits prescribed by CARB, but fail to meed the flat limits for at least one, if not more, of the aromatics, T50 and T90 requirements for new (Phase 2) reformulated gasoline, fail the California Predictive Model, and still obtain an excellent gasoline which exhibits low emissions. By observing the Reid vapor pressure and low sulfur, and preferably low olefin content requirements of the present invention, a gasoline fuel can be obtained which offers a substantially oxygenate free formulation allowing more flexibility to the refiner, but without sacrificing low emissions. The gasoline formulations of the present invention are particularly advantageous with regard to nitrogen oxide emissions ($NO_x$), for which there is increased concern with regard to the environment.

The gasoline fuel compositions of the present invention are applicable to all gasoline fueled cars, particularly those equipped with a catalytic converter, but have been found to be most advantageous for newer gasoline fueled automobiles, and in particular vehicles certified to California Low Emission Vehicle (LEV) standards and beyond. For it is in such newer model cars, as exemplified by the 1998 Ford Contour with a 2.0 liter engine, and 1997 Nissan Altima with a 2.4 liter engine, both certified to Transitional Low Emissions Vehicles (TLEV) standards, that particular advantages are seen with regard to $NO_x$ emissions, while also observing acceptable emissions with regard to exhaust hydrocarbons. The gasoline fuel compositions of the present invention are also useful throughout the year, with perhaps some modification in the RVP for seasonal requirements.

In a preferred embodiment of the present invention, the unleaded gasoline fuel is substantially free of oxygenates, has a Reid vapor pressure of less than 7.5 psi and has a sulfur content of less than 30 ppmw. The aromatic hydrocarbon content is greater than 25 volume percent but less than 30, the 50% D-86 Distillation Point is no greater than 220° F., and preferably no greater than 210° F., and the 90% D-86 Distillation Point is no greater than 330° F., and preferably no greater than 300° F. The unleaded gasoline fuel also preferably has an olefin content of 8 volume percent or less, more preferably 5 volume percent or less, and most preferably about 2–3 volume percent or less. The gasoline fuel also fails to meet the requirements of the present California Predictive Model for emissions.

In another preferred embodiment of the present invention, the unleaded gasoline fuel of the present invention is substantially free of oxygenates, has a Reid vapor pressure less than 7.5 psi, and has a sulfur content of less than 30 ppmw. The aromatic hydrocarbon content is no greater than 30 volume percent, and preferably no greater than 25 volume percent, and the fuel has a 50% D-86 Distillation Point greater than 210° F. but less than 220° F. The fuel also has a 90% D-86 Distillation Point no greater than 330° F., and preferably no greater than 300° F. Preferably, the olefin content of the gasoline fuel is 8 volume percent or less, more preferably 5 volume percent or less, and most preferably about 2–3 volume percent or less. The gasoline fuel also fails the present California Predictive Model requirements for emissions.

In another preferred embodiment of the present invention, the unleaded gasoline fuel is substantially free of oxygenates, has a Reid vapor pressure of less than 7.5 psi, and has a sulfur content of less than 30 ppmw. The aromatic hydrocarbon content is no greater than 30 volume percent, and preferably no greater than 25 volume percent, and the fuel has a 50% D-86 Distillation Point no greater than 220° F., and preferably no greater than 210° F. The fuel also has 90% D-86 Distillation Point greater than 300° F., but no greater than 330° F. It is most preferred that the olefin content of the gasoline fuel is also 8 volume percent or less, more preferably 5 volume percent or less, and most preferably about 2–3 volume percent or less. The gasoline fuel also fails the present California Predictive Model requirements for emissions.

In the preferred embodiments of the present invention, in general, the Reid vapor pressure of the gasoline fuels of the present invention are less than 7.5 psi, but are most preferably no greater than 7.0. The sulfur content of the gasoline fuels of the present invention is less than 30 ppmw, and more preferably less than 20 ppmw. In the most preferred embodiments, the amount of sulfur contained in the unleaded gasoline fuels of the present invention is less than 15 ppmw sulfur, with the most preferred embodiment involving an unleaded gasoline fuel which contains no greater than 10 ppmw sulfur. It is further preferred that the olefin content be low, for the low olefin content is believed to enhance the low sulfur effects and provide excellent performance. Therefore, the olefin content is preferably 8 volume percent or less, more preferably 6 volume percent or less, even more preferably 5 volume percent or less, and most preferably about 3 volume percent, even 2 volume percent, or less.

Generally, the lower the sulfur content, the more magnified the beneficial effects. Thus, in order to obtain more flexibility, particularly with regard to the aromatics, T-50 and T-90 characteristics, a lower sulfur content would be preferred. As mentioned previously, lower olefin content appears to enhance the beneficial effects of the low sulfur. Therefore, lowering the olefin content in combination with the low sulfur can also help add flexibility to the blending of a gasoline formulation which exhibits good emissions.

The fuels of the present invention are useful in operating automotive vehicles having a spark-ignited internal combustion engine. These fuels perform particularly well in vehicles designed for low exhaust emissions. These include vehicles certified to California Low Emissions Vehicle (LEV) standards and soon to be established Phase 2 LEV standards (LEV II) as well as U.S. Environmental Protection Agency National Low Emissions Vehicle (NLEV) standards, and soon to be established Tier 2 standards. The fuels are introduced into the engine and then combusted in the engine. In a preferred embodiment, the automotive vehicle also has a catalytic converter into which at least some of the engine exhaust emissions created by combusting the unleaded gasoline are introduced. The resulting emissions are then discharged from the vehicle exhaust system to the atmosphere. Most of the emissions are inert, non-harmful components, with the regulated components such as hydrocarbons and $NO_x$ being low. In particular, the emissions have a reduced amount of $NO_x$ emissions. The $NO_x$ emissions can surprisingly surpass even the level indicated by the Predictive Model developed by the California Air Resources Board with reference to a baseline fuel. In all cases, the potency-weighted toxic requirements should also be met by means of the reduced amount of oxygenates and olefins and appropriate limits on the amount of benzene The invention will be illustrated in greater detail by the following Example. It is understood that the Example is given by way of illustration and is not meant to limit the disclosure or the claims to follow.

EXAMPLE

If the following test procedures were followed, it is believed that the compositions listed in Table 2 would exemplify fuels in accordance with the present invention which would exhibit surprising emissions reductions.

All test fuels are stored in barrels in a refrigerated space maintained at 50±5° F. Barrels remain in the storage area for a minimum of 24 hours prior to being opened. They remain in a cooled area until they are depleted or the test program is completed. RVP (Reid vapor pressure) samples are drawn from the barrels when they are opened (100%) and as they approach depletion (10–20% capacity). RVP determinations are made with a Grabner Instruments CCA-VPS vapor pressure tester. Each batch of samples include a cyclopentane reference sample to insure analyzer integrity.

Testing is performed in accordance with "California Exhaust . . . Standards and Test Procedures for 1988 and Subsequent Model . . . Vehicles" (CCR Sec. 1960. 1), except those portions relating to evaporative emissions. Additional preconditioning is performed to insure that as much of the fuel from previous tests as possible is drained and removed from the fuel tank and fuel delivery system. This preconditioning ends with a standard drain and fill to 40% capacity, UDDS dynamometer preconditioning, and overnight soak prior to the exhaust emissions test.

Each vehicle receives a minimum of one test with each of the test fuels. The order of testing is completely randomized for each vehicle. All tests on a given vehicle are performed consecutively—vehicles are not left idle for extended periods while other program vehicles are being tested. The tests on a vehicle are performed on consecutive days.

Fuel injected vehicles generally provide an access port in the pressurized fuel line which is used to drain the vehicle fuel tank by activating the on-board fuel pump. A significant amount of fuel remains in the fuel tank below the fuel pump pickup, however. Repeated fills and drains are performed to dilute the fuel from a previous test with fuel for the upcoming test. Some engine operation is also required to purge the fuel line from the tank to the engine and from any bypass from the fuel rail back to the fuel tank. Modern feedback engine control systems also feature adaptive learning subsystems to provide baseline information regarding previous engine operation while the engine is warming up. Preconditioning is designed to insure that any calibration changes resulting from the adaptive learning process are fully completed with the new fuel.

The preconditioning procedure includes:

1. Draining tank and adding 20–25% fill of fresh test fuel. Idling engine for 5 minutes.
2. Draining tank and adding 20–25% fill of fresh test fuel. Performing one LA-4 and one HFET schedule on the dynamometer.
3. Soaking vehicle in controlled temperature soak room for a minimum of one hour.
4. Draining and filling to 40% capacity with fresh test fuel. Performing LA-4 dynamometer preconditioning. Soaking in controlled temperature soak room until the vehicle was transferred to the test cell for the FTP.

The multiple drains and fills insure that the amount of fuel remaining from previous tests is minimized. The engine operation and soaks provide ample opportunity for any adaptive learning process to stabilize with the new fuel. The final steps insure compliance with the CCR requirements for the exhaust emission test.

The FTP exhaust emissions test includes measurement of non-methane hydrocarbons (NMHC), and $NO_x$ in accordance with Federal and California test procedures.

GC bag samples are collected for each test phase of the FTP (3 bags), with dilution air sample collection of the Cold Transient and Stable phase combined, and the Hot Transient Phase (2 background bags). GC samples are collected on tests of the vehicle.

Subtle changes in exhaust emissions and fuel economy may be overshadowed by test to test variability. Changes in some fuel properties typically result in small, difficult to measure, changes in exhaust emissions. Procedures developed for ASTM testing of fuel efficient engine oils have been demonstrated to greatly improve test repeatability such that careful attention is given to preconditioning and soak conditions to further assure consistency in the tests. The compositions listed in Table 2 exemplify compositions in accordance with the invention, which if tested as described above, would demonstrate low emissions.

TABLE 2

| | Test Fuels | | | | | | | | | | | | | | |
|---|---|---|---|---|---|---|---|---|---|---|---|---|---|---|---|
| | Fuel A | Fuel B | Fuel C | Fuel D | Fuel E | Fuel F | Fuel G | Fuel H | Fuel I | Fuel J | Fuel K | Fuel L | Fuel M | Fuel N | Fuel O |
| Oxygen (wt %) | 0 | 0 | 0 | 0 | 0.5 | 0.75 | 0.25 | 0 | 0 | 0 | 0 | 0.25 | 0 | 0 | 0 |
| Aromatics (vol %) | 30 | 28 | 28 | 27 | 25 | 22 | 25 | 28 | 22 | 25 | 28 | 22 | 25 | 28 | 25 |
| Olefins (vol %) | 2 | 8 | 8 | 4 | 4 | 5 | 3 | 2 | 2 | 6 | 2 | 6 | 2 | 2 | 3 |
| Temperature at 50% distilled (° F.) | 220 | 215 | 210 | 215 | 210 | 215 | 210 | 210 | 215 | 220 | 210 | 210 | 220 | 210 | 215 |
| Temperature at 90% distilled (° F.) | 300 | 310 | 320 | 320 | 305 | 300 | 320 | 320 | 300 | 290 | 300 | 320 | 290 | 310 | 315 |
| Sulfur (ppmw) | 30 | 20 | 10 | 15 | 15 | 15 | 10 | 10 | 15 | 20 | 15 | 10 | 10 | 5 | 10 |
| Benzene (vol %) | 0.6 | 0.6 | 0.5 | 0.7 | 1.0 | 1.0 | 1.0 | 1.0 | 1.0 | 1.0 | 1.0 | 1.0 | 1.0 | 1.0 | 1.0 |
| Reid Vapor (psi) Pressure | 7.5 | 7 | 7 | 7 | 7.5 | 7.0 | 7.0 | 7.0 | 7.5 | 7.0 | 7.0 | 7.0 | 7.0 | 7.0 | 7.0 |

One of the main advantages of the invention is that a less polluting substantially oxygenate free gasoline fuel is provided that can be more easily prepared in a petroleum refinery or the like. That is, in a typical refinery in which gasoline is produced for sale, particularly in California, it is necessary or at least desirable in most instances to blend the hydrocarbon stocks so as to produce gasolines of specified Reid vapor pressure, aromatic content, etc., and which meet all of the CARB Phase 2 gasoline requirements. In addition, the gasoline must meet other specifications, such as octane to assure good performance of the automobile. Thus, the only difference is that now the refinery will blend the stocks in light of the information provided herein such that the emissions are reduced, particularly the $NO_x$ emissions, as much as required or practicable, given the individual situation (the blend stocks available, refinery capacity, etc.) facing the particular refinery. By following the present invention, additional flexibility is offered in blending the fuels, particularly with regard to the aromatic hydrocarbon content, the T50 and T90 specifications. Yet, an environmentally friendly fuel is provided which offers good performance and surprisingly low $NO_x$ emissions, as well as flexibility in blending.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An unleaded gasoline fuel, which is substantially free of oxygenates and has a Reid vapor pressure less than 7.5 psi;

a sulfur content less than 10 ppmw;

an aromatics content of greater 25 volume percent but no greater than 30 volume percent; and the fuel composition fails the California Predictive Model requirements for emissions.

2. The unleaded gasoline fuel of claim 1, wherein the olefin content is 8.0 volume percent or less.

3. The unleaded gasoline fuel of claim 2, wherein the fuel has a Reid vapor pressure no greater than 7.0.

4. The unleaded gasoline fuel of claim 2, wherein the olefin content of the fuel is 6 volume percent or less.

5. The unleaded gasoline fuel of claim 2, wherein the olefin content of the fuel is 5 volume percent or less.

6. The unleaded gasoline fuel of claim 2, wherein the olefin content of the fuel is 3 volume percent or less.

7. The unleaded gasoline fuel of claim 2, wherein the olefin content of the fuel is no greater than about 2 volume percent.

8. The unleaded gasoline fuel of claim 2, wherein the fuel has a 50% D-86 Distillation Point no greater than 210° F.

9. The unleaded gasoline fuel of claim 2, wherein the fuel has a 90% D-86 Distillation Temperature no greater than 300° F.

10. The unleaded gasoline fuel of claim 1, wherein the fuel has a 50% D-86 Distillation Temperature between 210 and 220° F., and/or a 90% D-86 Distillation Temperature between 300 and 330° F.

11. An unleaded gasoline fuel, which is substantially free of oxygenates and has a Reid vapor pressure less than 7.5 psi;

a sulfur content less than 10 ppmw; and a 50% D-86 Distillation Temperature greater than 210 but no greater than 220° F., and the fuel composition fails the California Predictive Model requirements for emissions.

12. The unleaded gasoline fuel of claim 11, wherein the olefin content is 8 volume percent or less.

13. The unleaded gasoline fuel of claim 12, wherein the fuel has a Reid vapor pressure no greater than 7.0.

14. The unleaded gasoline fuel of claim 12, wherein the olefin fuel content is 6 volume percent or less.

15. The unleaded gasoline fuel of claim 12, wherein the olefin fuel content is 5 volume percent or less.

16. The unleaded gasoline fuel of claim 12, wherein the olefin fuel content is 3 volume percent or less.

17. The unleaded gasoline fuel of claim 12, wherein the olefin fuel content is no greater than about 2 volume percent.

18. The unleaded gasoline fuel of claim 12, wherein the aromatic hydrocarbon content is no greater than 25 volume percent.

19. The unleaded gasoline fuel of claim 12, wherein the fuel has a 90% D-86 Distillation Temperature no greater than 300° F.

20. The unleaded gasoline fuel of claim 12, wherein the fuel has an aromatic hydrocarbon content between 25 and 30 volume percent, and/or a 90% D-86 Distillation Temperature between 300 and 330° F.

21. An unleaded gasoline fuel, which is substantially free of oxygenates and has a Reid vapor pressure less than 7.5 psi;

a sulfur content less than 10 ppmw; and a 90% D-86 Distillation Temperature between 300 and 330° F., and the fuel composition fails the California Predictive Model requirements for emissions.

22. The unleaded gasoline fuel of claim 21, wherein the olefin content is 8 volume percent or less.

23. The unleaded gasoline fuel of claim 22, wherein the fuel has a Reid vapor pressure no greater than 7.0.

24. The unleaded gasoline fuel of claim 22, wherein the olefin fuel content is 5 volume percent or less.

25. The unleaded gasoline fuel of claim 22, wherein the olefin fuel content is 3 volume percent or less.

26. The unleaded gasoline fuel of claim 22, wherein the olefin fuel content is no greater than about 2 volume percent.

27. The unleaded gasoline fuel of claim 22, wherein the aromatic hydrocarbon content is no greater than 25 volume percent.

28. The unleaded gasoline fuel of claim 22, wherein the fuel has a 50% D-86 Distillation Point no greater than 210° F.

29. The unleaded gasoline fuel of claim 22, wherein the fuel has an aromatic hydrocarbon content between 25 and 30 volume percent, and/or a 50% D-86 Distillation Temperature between 210 and 220° F.

30. A method for operating an automotive vehicle having a spark-ignited, internal combustion engine, comprising:

introducing into the engine the unleaded gasoline fuel of claim 1, and then combusting the unleaded gasoline in the engine.

31. The method of claim 30, wherein the automotive vehicle also has a catalytic converter into which at least some of the engine exhaust emissions created by combusting the unleaded gasoline is introduced, with emissions then being discharged from the catalytic converter and subsequently to the atmosphere.

32. The method of claim 30, wherein the introduction into the engine of an unleaded gasoline is accomplished by fuel injection.

33. The method of claim 31, wherein the introduction into the engine of an unleaded gasoline is accomplished by fuel injection.

34. The method of claim 31, wherein the gasoline introduced into the engine has a Reid vapor pressure no greater than 7.0.

35. The method of claim 31, wherein the gasoline introduced into the engine contains 5 volume percent olefin or less.

36. The method of claim 35, wherein the gasoline fuel introduced into the engine has an olefin content of 3 volume percent or less.

37. The method of claim 35, wherein the gasoline has an olefin content of no greater than 2 volume percent.

38. A method for operating an automotive vehicle having a spark-ignited, internal combustion engine, comprising:

introducing into the engine the unleaded gasoline fuel of claim 15, and then combusting the unleaded gasoline in the engine.

39. The method of claim 38, wherein the automotive vehicle also has a catalytic converter into which at least some of the engine exhaust emissions created by combusting the unleaded gasoline is introduced, with emissions then being discharged from the catalytic converter and subsequently to the atmosphere.

40. The method of claim 38, wherein the introduction into the engine of an unleaded gasoline is accomplished by fuel injection.

41. The method of claim 39, wherein the introduction into the engine of an unleaded gasoline is accomplished by fuel injection.

42. The method of claim 39, wherein the gasoline introduced into the engine has a Reid vapor pressure no greater than 7.0.

43. The method of claim 39, wherein the gasoline introduced into the engine contains 5 volume percent olefin or less.

44. The method of claim 39, wherein the gasoline fuel introduced into the engine has an olefin content of 3 volume percent or less.

45. The method of claim 39, wherein the gasoline has an olefin content of no greater than 2 volume percent.

46. A method for operating an automotive vehicle having a spark-ignited, internal combustion engine, comprising:

introducing into the engine the unleaded gasoline fuel of claim 21, and then combusting the unleaded gasoline in the engine.

47. The method of claim 46, wherein the automotive vehicle also has a catalytic converter into which at least some of the engine exhaust emissions created by combusting the unleaded gasoline is introduced, with emissions then being discharged from the catalytic converter and subsequently to the atmosphere.

48. The method of claim 46, wherein the introduction into the engine of an unleaded gasoline is accomplished by fuel injection.

49. The method of claim 47, wherein the introduction into the engine of an unleaded gasoline is accomplished by fuel injection.

50. The method of claim 47, wherein the gasoline introduced into the engine has a Reid vapor pressure no greater than 7.0.

51. The method of claim 47, wherein the gasoline introduced into the engine contains 5 volume percent olefin or less.

52. The method of claim 47, wherein the gasoline fuel introduced into the engine has an olefin content of 3 volume percent or less.

53. The method of claim 47, wherein the gasoline has an olefin content of no greater than 2 volume percent.

* * * * *